(12) United States Patent
Bradbury et al.

(10) Patent No.: US 6,187,084 B1
(45) Date of Patent: *Feb. 13, 2001

(54) INK COMPOSITIONS

(75) Inventors: Roy Bradbury, St Helens; Clive Moscrop, Heywood; Barry Huston Meyrick, Urmston; Mark Holbrook, Bury, all of (GB)

(73) Assignee: Zeneca Ltd., London (GB)

( * ) Notice: Under 35 U.S.C. 154(b), the term of this patent shall be extended for 0 days.

This patent is subject to a terminal disclaimer.

(21) Appl. No.: 09/277,378

(22) Filed: Mar. 29, 1999

(30) Foreign Application Priority Data

Mar. 31, 1998 (GB) .................................................. 9806810

(51) Int. Cl.⁷ ........................... C09D 11/02; C09B 29/039
(52) U.S. Cl. ...................... 106/31.5; 534/753; 534/778; 534/779; 534/794; 534/795
(58) Field of Search ..................... 106/31.5, 753, 106/778, 779, 794, 795; 534/753, 778, 779, 794, 795

(56) References Cited

U.S. PATENT DOCUMENTS

| | | | |
|---|---|---|---|
| 4,259,237 | * 3/1981 | Hamprecht | 534/794 |
| 4,496,480 | * 1/1985 | Bergmann et al. | 534/794 |
| 4,619,992 | * 10/1986 | Bergmann et al. | 534/778 |
| 4,764,600 | * 8/1988 | Bergmann et al. | 534/778 |
| 4,774,324 | 9/1988 | Loeffler et al. | 534/766 |
| 4,855,412 | 8/1989 | Dehnert et al. | 534/766 |
| 4,939,118 | 7/1990 | Etzbach et al. | 503/227 |
| 4,960,874 | * 10/1990 | Bergmann et al. | 534/794 |
| 5,028,262 | * 7/1991 | Barlow, Jr. et al. | 106/31.5 |
| 5,200,386 | 4/1993 | Sens et al. | 503/227 |
| 5,518,983 | * 5/1996 | Bradbury et al. | 503/227 |
| 5,567,470 | * 10/1996 | Koshida et al. | 106/31.5 |
| 5,635,442 | * 6/1997 | Bradbury et al. | 503/227 |
| 5,693,766 | * 12/1997 | Bradbury | 534/794 |
| 5,785,719 | * 7/1998 | Etzbach et al. | 8/471 |

FOREIGN PATENT DOCUMENTS

| | | |
|---|---|---|
| 0227095 | 7/1987 | (EP) . |
| 4148987 | 5/1992 | (JP) . |
| 9404370 | 3/1994 | (WO) . |
| 9408797 | 4/1994 | (WO) . |
| 9528287 | 10/1995 | (WO) . |
| 9611987 | 4/1996 | (WO) . |
| 9747690 | 12/1997 | (WO) . |
| 9814525 | 4/1998 | (WO) . |

\* cited by examiner

*Primary Examiner*—Helene Klemanski
(74) *Attorney, Agent, or Firm*—Rothwell, Figg, Ernst & Manbeck

(57) ABSTRACT

An ink comprising water, a water-dissipatable polymer and one or more dyes of Formula (1):

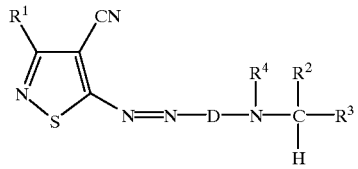

Formula (1)

wherein:

$R^1$ is H or a substituent;

$R^2$ and $R^3$ are each independently optionally substituted alkyl, aryl or aralkyl, or $R^2$ and $R^3$ together with the carbon atom to which they are attached form an optionally substituted ring;

$R^4$ is H or optionally substituted alkyl, aryl or aralkyl; and

D is an optionally substituted arylene group. Also claimed are the dyes of Formula (1), ink jet printing processes and cartridges containing the inks.

9 Claims, No Drawings

INK COMPOSITIONS

This invention relates to inks, dyes, cartridges, ink jet printers and to their use in ink jet printing.

Ink jet printing methods involve a non-impact printing technique for printing an image onto a substrate using ink droplets ejected through a fine nozzle onto a substrate without bringing the nozzle into contact with the substrate.

There are many demanding performance requirements for dyes and inks used in ink jet printer. For example they should desirably exhibit some or all of the following properties. They should provide sharp, non-feathered images having good water-fastness, light fastness and/or optical density. The inks are often required to dry quickly when applied to a substrate to prevent smudging, but they should not form a crust over the tip of an ink jet nozzle because this will stop the printer from working. The inks should also be stable to storage over time without decomposing or forming a precipitate which could block the fine nozzle. The most popular ink jet printers are the thermal and piezoelectric ink jet printers.

We have now found that very good ink jet printing inks may be prepared having the compositions defined below using a specific class of dyes that give stable dye resin inks with some or all of these advantageous properties.

According to the present invention there is provided an ink comprising water, a water-dissipatable polymer and one or more dyes of Formula (1):

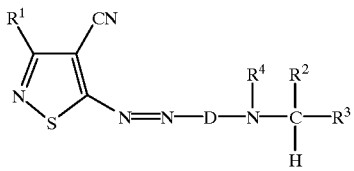

Formula (1)

wherein:

$R^1$ is H or a substituent;

$R^2$ and $R^3$ are each independently optionally substituted alkyl, aryl or aralkyl, or $R^2$ and $R^3$ together with the carbon atom to which they are attached form an optionally substituted ring;

$R^4$ is H or optionally substituted alkyl, aryl or aralkyl; and

D is an optionally substituted arylene group.

When $R^1$ is a substituent it is preferably halo; optionally substituted alkyl, aryl or aralkyl; or a group of formula —X—$R^5$ wherein X is O, S, SO, $SO_2$ or $NR^6$ wherein $R^5$ and $R^6$ are each independently H or optionally substituted alkyl, aryl or aralkyl.

When $R^1$, $R^2$, $R^3$, $R^4$, $R^5$ or $R^6$ is optionally substituted alkyl it is preferably optionally substituted $C_{1-6}$-alkyl.

When $R^1$, $R^2$, $R^3$, $R^4$, $R^5$ or $R^6$ is optionally substituted aryl it is preferably optionally substituted $C_{6-12}$-aryl, more preferably optionally substituted phenyl or naphthyl.

When $R^1$, $R^2$, $R^3$, $R^4$, $R^5$ or $R^6$ is optionally substituted aralkyl it is preferably optionally substituted benzyl or xylyl.

$R^1$ is preferably H, optionally substituted $C_{1-6}$-alkyl, or a group of formula —X—$R^5$ wherein X is O, S, SO, $SO_2$ or $NR^6$ wherein $R^5$ and $R^6$ are each independently H or optionally substituted $C_{1-6}$-alkyl.

X is preferably O, S or $NR^6$ wherein $R^6$ is H or $C_{1-6}$-alkyl.

$R^2$ and $R^3$ are preferably each independently optionally substituted $C_{1-6}$-alkyl, or $R^2$ and $R^3$ together with the carbon atom to which they are attached form an optionally substituted 5- or 6-membered ring, especially an optionally substituted cyclopentane or cyclohexane ring. Preferably $R^2$ and $R^3$ are unsubstituted or one or both of them carries 1 or 2 substituents.

$R^4$ and $R^5$ are preferably each independently H or optionally substituted $C_{1-6}$-alkyl, more preferably H or $C_{1-6}$-alkyl.

$R^6$ is preferably optionally substituted $C_{1-6}$-alkyl, more preferably optionally substituted $C_{1-4}$-alkyl.

D is preferably optionally substituted phenylene or naphthylene, more preferably optionally substituted 1,4-phenylene, especially 1,4-phenylene or 1,4-phenylene carrying one further substituent.

The optional substituents which may be present on D and $R^1$ to $R^6$ are preferably each independently selected from carboxy, sulpho, nitro, halo (especially bromo, chloro and fluoro), alkyl (especially $C_{1-4}$-alkyl), alkoxy (especially $C_{1-4}$-alkoxy), hydroxy, amine (especially —$NHR^7$), mercapto, thioalkyl (especially $C_{1-4}$-thioalkyl), cyano, ester (especially —$OCOR^7$ or —$COOR^7$) and amide (especially —$CONHR^7$), wherein $R^7$ is H or optionally substituted $C_{1-6}$-alkyl (especially H or $C_{1-4}$-alkyl), more preferably from —$NO_2$, —CN, —Cl, —Br, —F, —OH, —$C_{1-4}$-alkyl, —$OC_{1-4}$-alkyl, —$OC_{1-4}$-alkylene-CN, —$CONH_2$, —$COOC_{1-4}$-$(CH_2)_{1-4}$-CN, —$OCO(C_{1-4}$-alkyl) and —COO ($C_{1-4}$-alkyl).

Any alkyl groups in dyes of Formula (1) may be branched or straight chain. Preferred branched chain alkyl groups are α-branched alkyl groups.

The dyes may be in any form, in the form of a salt. Formula (1) includes all tautomers, stereoisomers, zwitterions, polymorphs and isotopes of dyes falling within the formula.

Salts of Formula (1) may be formed from one or more organic and/or inorganic bases or acids. Preferred salts of Formula (1) are insoluble in water.

The inks preferably contain from 1 to 10, more preferably from 1 to 6, especially from 1 to 3, more especially 1 dye of Formula (1).

The dye of Formula (1) is preferably insoluble in water and soluble in the water-dissipatable polymer. Therefore the dye is preferably free from carboxy and sulpho groups, for example it is preferably a disperse or solvent-soluble dye. Disperse and solvent soluble dyes are distinct from pigments in that pigments are insoluble in organic solvents and polyesters whereas disperse and solvent soluble dyes are soluble in organic solvents and polymers.

According to a second feature of the present invention there is provided a dye of Formula (1) as hereinbefore defined. The preferences for the dye of Formula (1) are as hereinbefore described in relation to the preferred dyes used in the inks of the invention.

The dyes of Formula (1) may be prepared by diazotising a suitable amine, using a diazotising agent, preferably below 5° C., and coupling to a suitable coupling component. A preferred diazotising agent is sodium nitrite. A suitable amine is of Formula (2) and a suitable coupling component is of Formula (3):

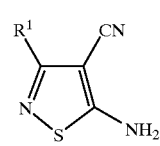

(2)

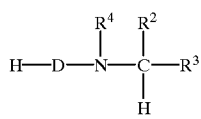

(3)

wherein $R^1$, $R^2$, $R^3$, $R^4$, $R^5$, $R^6$ and D are as hereinbefore defined.

Generally from 3 to 5 molar equivalents of the amine are used relative to the amount of the coupling component. If desired the resultant dye may be further reacted, for example by condensation with an acyl halide or an anhydride to convert some or all of any hydroxy groups to ester groups.

The ink may contain further dyes other than those of Formula (1), for example to modify the colour or brightness of the ink.

The water-dissipatable polymer preferably bears ionised carboxy and/or sulphonate groups, especially ionised sulphonate groups, because these assist water dissipatability of the polymer. Such groups can be chain pendant and/or terminal.

The water-dissipatable polymer is preferably a water-dissipatable polyester. The water-dissipatable polyester can be prepared using conventional polymerisation procedures known to be effective for polyester synthesis. Thus, it is well known that polyesters contain carbonyloxy (i.e. —C(=O)—O—) linking groups and may be prepared by a condensation polymerisation process in which an acid component (including ester-forming derivatives thereof) is reacted with a hydroxyl component, The acid component may be selected from one or more polybasic carboxylic acids, e.g. di- and tri-carboxylic acids or ester-forming derivatives thereof, for example acid halides, anhydrides or esters. The hydroxyl component may be one or more polyhydric alcohols or phenols (polyols), for example, diols, triols, etc. (It is to be understood, however, that the polyester may contain, if desired, a proportion of carbonylamino linking groups —C(=O)—NH— (i.e. amide linking groups) by including an appropriate amino functional reactant as part of the "hydroxyl component"; such as amide linkages). The reaction to form a polyester may be conducted in one or more stages. It is also possible to introduce in-chain unsaturation into the polyester by, for example, employing as part of the acid component an olefinically unsaturated dicarboxylic acid or anhydride.

Polyesters bearing ionised sulphonate groups may be prepared by using at least one monomer having two or more functional groups which will readily undergo an ester condensation reaction (e.g. carboxyl groups, hydroxyl groups or esterifiable derivatives thereof) and one or more sulphonic acid groups (for subsequent neutralisation after polyester formation) or ionised sulphonate groups (i.e. neutralisation of the sulphonic acid groups already having been effected in the monomer) in the synthesis of the polyester. In some cases it is not necessary to neutralise sulphonic acid groups since they may be sufficiently strong acid groups as to be considerably ionised in water even without the addition of base. Often, the sulphonic acid or ionised sulphonate containing monomer is a dicarboxylic acid monomer having at least one ionised sulphonate substituent (thereby avoiding any need to effect neutralisation subsequent to polyester formation). (Alternatively, alkyl carboxylic acid ester groups may be used in place of the carboxylic acid groups as ester-forming groups). Such a monomer will therefore be part of the acid component used in the polyester synthesis.

Preferred polybasic carboxylic acids which can be used to form the polyester have two or three carboxylic acid groups. For example, one can use $C_4$ to $C_{20}$ aliphatic, alicyclic and aromatic compounds having two or more carboxy groups and their ester forming derivatives (e.g. esters, anhydrides and acid chlorides), and dimer acids such as C36 dimer acids. Specific examples include adipic acid, fumaric acid, maleic acid, succinic acid, itaconic acid, sebacic acid, nonanedioic acid, decanedioic acid, 1,4-cyclohexanedicarboxylic acid, 1,3-cyclohexanedicarboxylic acid, 1,2-cyclohexane dicarboxylic acid, terephthalic acid, isophthalic acid, phthalic acid and tetrahydrophthalic acid and their acid chlorides. Anhydrides include succinic, maleic, phthalic and hexahydrophthalic anhydrides.

Preferred polyols which can be used to form the polyester include those having from 2 to 6, more preferably 2 to 4 and especially 2 hydroxyl groups per molecule. Suitable polyols having two hydroxy groups per molecule include diols such as 1,2-ethanediol, 1,3-propanediol, 1,4-butanediol, 1,6-hexanediol, 2,2-dimethyl-1,3-propanediol (neopentyl glycol), the 1,2-, 1,3- and 1,4-cyclohexanediols and the corresponding cyclohexane dimethanols, diethylene glycol, dipropylene glycol, and diols such as alkoxylated bisphenol A products, e.g. ethoxylated or propoxylated bisphenol A. Suitable polyols having three hydroxy groups per molecule include triols such as trimethylolpropane (1,1,1-tris(hydroxymethyl)ethane). Suitable polyols having four or more hydroxy groups per molecule include pentaerythritol (2,2-bis(hydroxymethyl)-1,3-propanediol) and sorbitol (1,2,3,4,5,6-hexahydroxyhexane).

Compounds having two or more groups which readily undergo an ester condensation reaction and have one or more sulphonate groups are dicarboxylic acid monomers having at least one ionised sulphonate group. Examples of such compounds are aromatic dicarboxylic acids having an ionised sulphonate group, for example those of the formula:

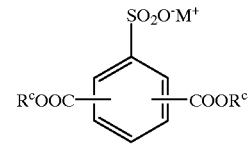

wherein M is a cation (preferably sodium, lithium or potassium)-, and each $R^c$ independently is H, a cation or $C_{1-4}$-alkyl (preferably methyl or ethyl). Preferred compounds of the above formula are of formula:

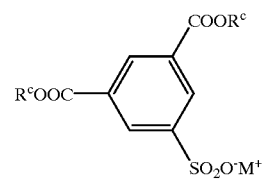

wherein M and Rc are as defined above. Particularly preferred is the mono sodium salt (one $R^c$ is H, the other is Na), this material being known as sodio-5-sulphoisophthalic acid (SSIPA).

Other useful compounds which have two or more groups which readily undergo an ester condensation reaction and have one or more sulphonate groups are dihydroxy monomers having at least one sulphonate group, especially those of the formula:

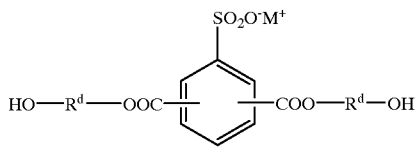

wherein M is as hereinbefore defined above and each Rd independently is alkylene, preferably $C_{2-4}$-alkylene. Preferred compounds of the above formula are:

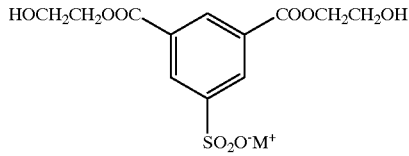

wherein M is as hereinbefore defined.

Polyesters bearing ionised carboxy groups can be prepared by various means. For example, if the hydroxyl component of the reactants is stoichiometrically in excess of the acid component, a hydroxyl-terminated polyester can be formed, which may be subsequently converted to a carboxy terminated polyester by wholly or partially reacting the hydroxyl groups with an appropriate reagent (e.g. an acid anhydride or a dicarboxylic acid). Alternatively, terminal carboxy functionality may be directly introduced by employing an appropriate stoichiometric excess of the acid component reactants. In another alternative, chain-pendant carboxy groups may be introduced by using reagents such as dimethylol propionic acid (DMPA) since if appropriate reaction condition are employed (e.g. polymerisation temperature below 150° C.) the hindered carboxy group thereof does not take part to any significant extent in the ester-forming reactions during the polyester synthesis and the DMPA effectively behaves as a simple diol. Chain-pendant and/or terminal carboxy groups could also be introduced by employing a tri- or higher functionality carboxylic acid or anhydride in the polyester synthesis, for example, trimellitic acid or anhydride. Combinations of the above procedures could also be used. It is thus seen that terminal or side-chain carboxy groups or both can be introduced as desired. These can be fully or partially neutralised with an appropriate base to yield ionised carboxy groups. The counter ions used may be as for the ionised sulphonate groups described above (apart from $H^+$ since the carboxylic acid groups themselves are normally insufficiently ionised to provide a significant amount of ionised carboxy groups—although F substituents would increase acid strength), with alkali metal ions such as $Na^+$, $Li^+$ and $K^+$ again being particularly preferred, and ammonium and organic amine derived cations less preferred because some have an undesirable odour.

The water-dissipatable polyester may optionally have hydrophilic non-ionic segments, for example within the polyester backbone (i.e. in-chain incorporation) or as chain-pendant or terminal groups. Such groups may act to contribute to the dispersion stability or even water-solubility of the polyester. For example, polyethylene oxide chains may be introduced into the polyester during its synthesis by using as part of the hydroxyl component, ethylene oxide-containing mono, di or higher functional hydroxy compounds, especially polyethlene glycols and alkyl ethers of polyethylene glycols, examples of which include:

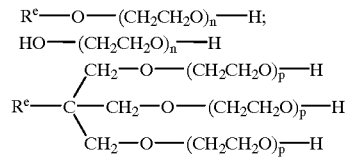

wherein $R^e$ is $C_{1-20}$-alkyl, preferably $C_{1-4}$-alkyl, more preferably methyl; n is 1 to 500; and p is 1 to 100.

A small segment of a polyethylene oxide chain could be replaced by a propylene oxide or butylene oxide chain in such non-ionic groups, but should still contain ethylene oxide as a major part of the chain.

The amount of ionised sulphonate and/or carboxy groups present in the polyester should be sufficient to provide or contribute to water-dissipatability of the polyester, although it should not be so high as to render the resulting polyester unacceptably water-sensitive. This amount will depend, inter alia, on factors such as the hydrophilicity/hydrophobicity of units provided by other monomers in the polyester synthesis or any surfactants (if used), and also the relative proportions of ionised sulphonate\carboxy groups. With regard to the last mentioned point, ionised sulphonate groups are more effective at providing or contributing to water-dissipatability than ionised carboxy groups and so can be used at considerably lower levels in comparison to ionised carboxy groups.

If the polyester is wholly or predominantly sulphonate stabilised (by which is meant the water dissipatability-providing groups are provided wholly or predominately by ionised sulphonate groups). The ionised sulphonate group content is preferably within the range from 7.5 to 100 milliequivalents (more preferably 10 to 75 milliequivalents and particularly 11 to 56 milliequivalents) per 100 g of polyester. When using SSIPA as the monomer for providing the ionised sulphonate groups, the amount of this monomer used in the polyester synthesis, based on the weight of all the monomers used in the polyester synthesis, will usually be within the range from 2 to 20% by weight (more usually 3 to 15% by weight). The carboxylic acid value (AV) of the polyester which is predominantly sulphonate stabilised, i.e. an AV based on the carboxylic acid groups only (i.e. excluding sulphonate groups) will generally be within the range of from 0 to 100 mgKOH/g, more preferably 0 to 50 mgKOH/g, especially 0 to 25 mgKOH/g, more especially 0 to 10 mgKOH/g.

If the polyester is predominantly stabilised by ionised carboxy groups, the carboxylic acid value AV of the polyester is preferably within the range of from 20 to 140 mgKOH/g (more preferably 30 to 100 mgKOH/g).

Usually, the polyester is either predominantly sulphonate-stabilised or predominantly carboxylate stabilised (preferably the former).

If the polyester contains polyethylene oxide chains, the polyethylene oxide chain content should preferably not exceed 25% by weight (and more preferably should not exceed 15% by weight), based on the total weight of the polyester, in order to avoid unacceptable water-sensitivity. Therefore the amount is preferably 0 to 25% by weight (more preferably 0 to 15% by weight) based on the total weight of polyester.

The water-dissipatable polyester preferably has a number average molecular weight Mn of up to 30,000. The Mn is preferably in the range from 500 to 30,000, more preferably 1,000 to 25,000. These Mn lead to particularly good storage stability for the resultant inks. The measurement of Mn is well known to those skilled in the art, and may for example be effected using gel permeation chromatography in conjunction with a standard polymer such as polystyrene or polymethylmethacrylate of known molecular weight.

The water-dissipatable polyester preferably has a hydroxyl number of from 0 to 225 mg KOH/g, more preferably 0 to 125 mg KOH/g, especially from 0 to 50 mgKOH/g.

The ink preferably has a pH of 5 to 9, more preferably 5.5 to 8, especially 6 to 7.5. These preferences are based on increased ink stability.

The Tg of the water-dissipatable polyester (i.e. the temperature at which the polymer changes from a glassy, brittle state to a plastic, rubbery state) is preferably in the range $-38°$C. to $105°$ C., more preferably $-20$ to $70°$ C., especially $-10°$ C. to $60°$ C.

The esterification polymerisation processes for making the polyesters for use in invention composition are known and need not be described here in more detail. Suffice to say that they are normally carried out in the melt using catalysts, for example a tin-based catalyst, and with the provision for removing any water or alcohol formed from the condensation reaction.

The water-dissipatable polyester may be dissipated in water by adding the solidified melt directly into water. The solidified melt is preferably in a form such as flake (which can often be obtained directly from the melt) or comminuted solid (obtained for example by grinding). Alternatively, water can be added directly to the hot polyester melt until the desired solids content/viscosity is reached. Still further, the polyester may be dissipated in water by adding an aqueous pre-dissipation (or organic solvent solution) of the polyester to the water phase.

The water-dissipatable polyesters normally do not need an external surfactant when being dissipated into water, although such surfactants may be used to assist the dissipation if desired and in some cases can be useful in this respect because additional surfactants reduce the required amount of dissipating groups (i.e. sulphonate, and (mono alkoxy) polyalkylene chains if used).

The water-dissipatable polymer may also be formed by performing free radical polymerisation of olefinically unsaturated monomers in the presence of a polyester. This gives what could be called a polyester-acrylic hybrid. Olefinically unsaturated monomers which can be used include olefinically unsaturated carboxy functional monomers, e.g. acrylic acid, methacrylic acid, fumaric acid, itaconic acid and β-carboxyethyl acrylate; olefinically unsaturated monomers which are free from carboxy and hydroxy groups, e.g. 1,3-butadiene, isoprene, styrene, vinylidene halides, vinylidene esters and esters of acrylic acid and methacrylic acid, e.g. methyl (meth) acrylate, ethyl (meth)acrylate n-butyl (meth)acrylate and 2-ethyl hexyl (meth)acrylate; and olefinically unsaturated monomers having a hydroxy group e.g. N-methylol (meth)acrylamide and hydroxy $C_{2-8}$-alkyl esters of (meth)acrylic acid. If the polyester has been prepared using a component which has unsaturation therein, e.g. fumaric acid, maleic acid or muconic acid or allyl-containing dihydroxy or dicarboxy compounds, the product from the polyesterification reaction will have unsaturation incorporated into its structure which can take part in the free radical polymerisation to give a graft copolymer. The free radical polymerisation processes use a free-radical generating initiator system such as (for example) the redox radical initiator system tertiary butylhydroxide/isoascorbic acid and will take place in the aqueous phase, rather than in the melt. However, excessive amounts of acrylic polymer (whether formed in the presence of polyester which has unsaturation or is free from unsaturation) often leads to a deterioration in ink properties and it is preferred that no acrylic polymer is present or, if its is present, the amount is less than 40%, preferably less than 30%, more preferably less than 10% by weight relative to the weight of polyester.

The dyed water-dissipatable polymer may be prepared by heating a water-dissipatable polymer and dye(s) at an elevated temperature, for example at a temperature in the range 35 to $150°$ C., preferably from 40 to $90°$ C. Simply mixing the dye and polymer in water at room temperature leads to a slight up-take of colour but heating is usually necessary for a full dyeing.

Preferably inks according to the invention are prepared by mixing together (i) a solution of a dye(s) in a water-immiscible solvent and (ii) a mixture of a water-dissipatable polymer, water-miscible solvent and optionally water. Equally the inks may be prepared by mixing together (i) a solution of a dye(s) in a mixture of a water-miscible solvent and a water-immiscible solvent and (ii) a water-dissipatable polymer and optionally water. In either case, if there is no water in component (ii) the water may be added to the mixture of (i) a (ii) subsequently to give an ink according to the invention. However it is preferred for component (ii) to contain water. These processes lead to particularly good up-take of dye(s) by the polymer to give intensely coloured inks.

The amount of dye and water-dissipatable polymer contained in the ink will vary according to the depth of shade required. Typically, however, the ink will comprise (a) from 0.5 to 15 parts, more preferably 0.8 to 10 parts, especially 1 to 5 parts in total of one or more the dyes of Formula (1);

(b) from 0.2 to 25 parts, more preferably 2 to 15 parts of a water-dissipatable polymer;

(c) from 40 to 90 parts, more preferably from 50 to 80 parts of water; and (d) from 0 to 60 parts, more preferably 0 to 40 parts of organic solvent; wherein all parts are by weight and the total number of parts of (a)+(b)+(c)+(d) add up to 100.

The number of parts of the water-dissipatable polymer is calculated on a 100% solids basis. For example 50 g of a 20% solids polymer is taken as log of polymer.

The ink may also contain an organic solvent (as mentioned in (d) above) and this may be a mixture of organic solvents. In a preferred embodiment the ink contains an organic solvent consisting of a water-miscible organic solvent and a water-immiscible organic solvent.

Suitable water-immiscible organic solvents include aromatic hydrocarbons, e.g. toluene, xylene, naphthalene, tetrahydronaphthalene and methyl naphthalene; chlorinated aromatic hydrocarbons, e.g. chlorobenzene, fluorobenzene, chloronaphthalene and bromonaphthalene; esters, e.g. butyl acetate, ethyl acetate, methyl benzoate, ethyl benzoate, benzyl benzoate, butyl benzoate, phenylethyl acetate, butyl lactate, benzyl lactate, diethyleneglycol dipropionate, dimethyl phthalate, diethyl phthalate, dibutyl phthalate, di (2-ethylhexyl) phthalate; alcohols having six or more carbon atoms, e.g. hexanol, octanol, benzyl alcohol, phenyl ethanol, phenoxy ethanol, phenoxy propanol and phenoxy butanol; ethers having at least 5 carbon atoms, preferably $C_{5-14}$ ethers, e.g. anisole and phenetole; nitrocellulose, cellulose ether, cellulose acetate; low odour petroleum distillates; turpentine; white spirits; naphtha; isopropylbiphenyl; terpene; vegetable oil; mineral oil; essential oil; and natural oil; and mixtures of any two or more thereof. Benzyl alcohol is especially preferred.

Suitable water-miscible organic solvents include $C_{1-5}$-alkanols, e.g. methanol, ethanol, n-propanol, isopropanol, n-butanol, sec-butanol, tert-butanol and isobutanol; amides, e.g. dimethylformamide and dimethylacetamide; ketones and ketone alcohols, e.g. acetone and diacetone alcohol; $C_{2-4}$-ether, e.g. tetrahydrofuran and dioxane; alkylene glycols or thioglycols containing a $C_2$–$C_6$ alkylene group, e.g. ethylene glycol, propylene glycol, butylene glycol, pentylene glycol and hexylene glycol; poly(alkylene-glycol)s and thioglycol)s, e.g. diethylene glycol, thiodiglycol, polyethylene glycol and polypropylene glycol; polyols, e.g. glycerol and 1,2,6-hexanetriol; and lower alkyl glycol and polyglycol ethers, e.g. 2-methoxyethanol, 2-(2-methoxyethoxy)ethanol, 2-(2-ethoxyethoxy) ethanol, 2-(2-butoxyethoxy)ethanol, 3-butoxypropan-1-ol, 2-[2-(2-methoxyethoxy)-ethoxy] ethanol, 2-[2-(2-ethoxyethoxy)ethoxy]-ethanol; cyclic esters and cyclic amides, e.g. optionally substituted pyrollidones; sulpholane; and mixtures containing two or more of the aforementioned water-miscible organic solvents. Preferred water-miscible organic solvents are $C_{1-6}$-alkyl mono ethers of $C_{2-6}$-alkylene glycols and $C_{1-6}$-alkyl mono ethers of poly($C_{2-6}$-alkylene glycols).

Component (d) of the above mentioned inks preferably comprises;

(i) 5 to 50% of a water-immiscible alcohol having at least six carbon atoms, (especially benzyl alcohol); and (ii) 50 to 95% of a water-miscible solvent comprising;

(a) a cyclic ester or cyclic amide (especially an optionally substituted pyrrolidone);

(b) a water-miscible $C_{1-6}$-alkyl mono ether of a $C_{2-6}$-alkylene glycol or $C_{1-6}$-alkyl mono ether of poly($C_{2-6}$-alkylene glycol); or (c) a mixture of (a) and (b).

wherein all % are by weight and add up to 100%.

The water-immiscible solvent preferably has a solubility in water at 20° C. of up to 50 g/l. The water-miscible solvent preferably has a solubility in water at 20° C. of more than 50 g/l.

The preferred optionally substituted pyrrolidones, are 2-pyrrolidone, dimethyl pyrrolidone, N-methyl-2-pyrrolidone, N-ethyl-2-pyrrolidone and N-(2-hydroxyethyl)-2-pyrrolidone and mixtures thereof.

The ratio of water-miscible organic solvent to water-immiscible organic solvent is preferably 19:1 to 1:1, more preferably 8:1 to 1:1, especially 5:1 to 1:1.

Use of dyes has advantages over the use of pigments in that less dye is usually required than would be the case for a pigment, expensive milling is avoided, the inks are less likely to form a precipitate on standing, a far greater variety of shades are available and the resultant prints have good transparency. The inks of the present invention also benefit from good light- and water-fastness.

Preferably the inks of the invention have been filtered to remove particulate matter through a filter having a mean pore size below 10 μm, more preferably below 5 μm, especially below 2 μm. Suitable filters may be obtained from a number of sources including Millipore (UK) Ltd. Removal of these particles significantly improves performance in ink jet printers by reducing the likelihood of nozzle blockage.

A valuable feature of the invention is the low tendency for blocking the nozzles of thermal ink jet printers. Many other water dispersible polymer inks work poorly or even not at all in thermal printers. Inks of the invention form discrete droplets on the substrate with little tendency for diffusing. Consequently sharp images can be obtained, resulting in excellent print quality and little if any bleed between colours printed side-by side.

A further feature of the invention provides a composition comprising a water-dissipatable polymer and a dye as hereinbefore defined, preferably of Formula (1) or (2). In these compositions the preferred water-dissipatable polymers and dyes are as hereinbefore described. Such compositions may be dissipated in water and optionally mixed with further ingredients to give in ink, for example with one or more organic solvents.

The composition preferably comprises (a) 0.125 to 40 parts of a dye as hereinbefore defined (preferably of Formula (1) or (2)); and (b) 99.875 to 60 parts of a water-dissipatable polymer, wherein the total number of parts of (a) and (b) adds up to 100.

According to a further feature the present invention provides a process for printing an image on a substrate comprising applying thereto an ink comprising water, a water-dissipatable polymer and a dye as hereinbefore defined (preferably of Formula (1) or (2)) by means of an ink jet printer.

The ink jet printer emits droplets of the ink onto a substrate from a nozzle without bringing the nozzle into contact with the substrate. Preferably the ink jet printer is a thermal or piezoelectric ink jet printer.

The substrate is preferably a paper, an overhead projector slide or a textile material. Preferred textile materials are cotton, polyester and blends thereof.

When the substrate is a textile material the process for printing an image thereon according to the invention preferably further comprises the step of heating the resultant printed textile, preferably to a temperature of 50° C. to 250° C.

A further feature of the present invention is a cartridge suitable for use in an ink jet printer containing an ink according to the invention. Also there is provided an ink jet printer containing an ink according to the invention.

The invention is further illustrated by the following examples in which all parts and percentages are by weight unless specified otherwise.

Water-Dissipatable Polymer ("Resin 1")

To a glass reactor fitted with distillation column and condenser were charged ingredients A, B, D, F, G and 50% of C and 50% of H. The contents were heated with stirring to a reaction temperature of 210° C. until the mixture was clear and the acid value was <10 mg(KOH)g$^{-1}$. At this point E and the remainder of C and H were charged and the temperature raised to 230° C. The reaction was continued under reduced pressure until an acid value of 5.3 mg(KOH) g$^{-1}$ was obtained. The resin was further characterised by a hydroxyl value=27.6 mg(KOH)g$^{-1}$, ICI Cone and Plate viscosity@125° C.=80 poises and a Tg (onset)=25.4° C. and a number average molecular weight by end group analysis of approximately 2000. The resin was readily dispersed in warm distilled water to give a clear solution having a solids content of 20% wow (hereinafter "Resin 1").

| Resin 1 | | |
| --- | --- | --- |
| Monomer | Abbreviation | Weight (g) |
| Neopentyl glycol | A | 206.25 |
| Diethylene glycol | B | 82.5 |
| Isophthalic acid | C | 300 |
| Sodio-5-sulpho-isophthalic acid | D | 75 |
| Adipic acid | E | 37.5 |
| Methoxy PEG 750 | F | 75 |
| Sodium acetate | G | 1.5 |
| Fascat 4101 | H | 0.75 |

Water-dissipatable Polymer ("Resin 2")

To a glass reactor fitted with distillation column and condenser were charged ingredients A, B, C, E, G, H and 50% of D and 50% of I. The contents were heated with stirring to a reaction temperature of 210° C. until the mixture was clear and the acid value was 1.25 mg(KOH)g$^{-1}$. At this point F and the remainder of D and I were charged and the temperature raised to 230° C. The reaction was continued under reduced pressure until an acid value of 2.8 mg(KOH) g$^{-1}$ was obtained. The resin was further characterised by a hydroxyl value=19.7 mg(KOH)g$^{-1}$, ICI Cone and Plate viscosity@125° C.=90 poises and a Tg (onset)=4° C. The resin was readily dispersed in warm distilled water to give a clear solution having a solids content of 20% w/w. (hereinafter "Resin 2").

Resin 2

| Monomer | Abbreviation | Weight (g) |
| --- | --- | --- |
| Neopentyl glycol | A | 653.47 |
| Diethylene glycol | B | 479.21 |
| Hexane-1,6-diol | C | 396.04 |
| Isophthalic acid | D | 1584.16 |
| Sodio-5-sulpho-isophthalic acid | E | 396.04 |
| Adipic acid | F | 198.02 |
| Methoxy PEG 750 | G | 396.04 |
| Sodium acetate | H | 8 |
| Fascat 4101 | I | 4 |

Water-Dissipatable Polymer ("Resin 3")

To a glass reactor fitted with distillation column and condenser were charged ingredients A, B, D, E, F, G and 50% of C and 50% of H. The contents were heated with stirring to a reaction temperature of 210° C. until the mixture was clear and the acid value was <10 mgKOH/g. At this point the remainder of C and H were charged and the temperature raised to 230° C. The reaction was continued under reduced pressure until an acid value of 9.4 mg(KOH) g$^{-1}$ was obtained. The resin was further characterised by a hydroxyl value=12.8 mg(KOH)g$^{-1}$, ICI Cone and Plate Viscosity@125° C.=>500 poises and a Tg (onset)=18° C. The number average molecular weight as determined by gel permeation chromatography (PS Equivalents) was 1800. The resin was readily dispersed in warm distilled water to give a clear solution having a solids content of 20% w/w (hereinafter "Resin 3").

Resin 3

| Monomer | Abbreviation | Weight (g) |
| --- | --- | --- |
| Neopentyl glycol | A | 15 |
| Diethylene glycol | B | 10 |
| Isophthalic acid | C | 45 |
| Sodio-5-sulpho-isophthalic acid | D | 10 |
| Hexane-1,6-diol | E | 10 |
| Methoxy PEG 750 | F | 10 |
| Sodium acetate | G | 0.2 |
| Fascat 4101 | H | 0.1 |

EXAMPLE 1

Preparation of a dye of the following formula (Dye 1)

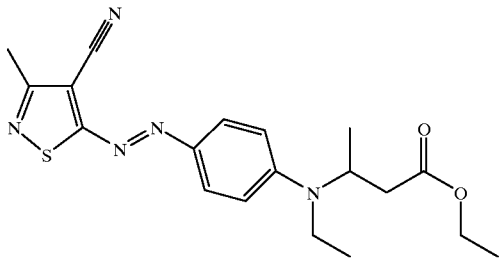

(a) Preparation of a coupling component of formula:

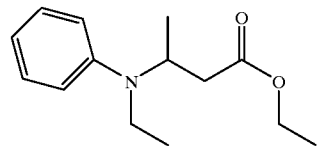

(i) Zinc dust (100 g) was activated by stirring in 5% hydrochloric acid. The acid was removed and the zinc then washed with water, methanol and then diethyl ether. The zinc dust was then slowly added to a flask containing acetic acid (250 ml), aniline (27.94 g) and ethyl acetoacetate (39.04 g). The reaction was stirred at 60° C. for 30 minutes and then allowed to cool to room temperature. The reaction mixture was filtered and the residue washed with methanol. The combined filtrates were evaporated to dryness, to which was added ice/water (100 ml) and dichloromethane (200 ml). The pH of the mixture was adjusted to 10 with ammonia solution, and then the product was isolated from the dichloromethane layer to give an oil (64 g).

(ii) The product from stage I(a)(i) above (32.41 g), iodoethane (50.00 g), calcium carbonate (25.65 g) and water (300 ml) were placed in a flask and heated at 70° C. for 5 days. The cooled reaction mixture was filtered through kieselguhr, and extracted with dichloromethane to give the product (30.22 g).

(b) Preparation of diazo component 5-amino-4-cyano-3-methylisothiazole (i) Preparation of (1-ethoxyethylidene)malononitrile

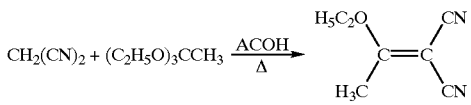

Malononitrile (65.66 g, 0.994 mole) was charged to a 500 ml multi-neck flask equipped with air stirrer and thermometer and arranged for distillation. Triethyl orthoacetate (218 ml, 193 g, 1.19 mole, ca 1.2 equivalents) was then added followed by glacial acetic acid (2.9 ml). The mixture was stirred and gently heated until the ethanol formed in the reaction began to distil off.

When all the ethanol had distilled-off the temperature was raised slowly from about 90° C. to 140° C. for 30 mins to ensure completion of the reaction. A total of 136 ml of distillate had been collected (theory=116.7 ml) which presumably contained some triethyl orthoacetate.

The reaction mixture was allowed to cool. At 45° C. the reaction mixture solidified. The solid mass was broken up under hexane (200 ml) and the hexane decanted off. 74 OP ethanol (150 ml) was added and the mixture stirred and heated under reflux giving a homogenous dark solution. The solution was allowed to cool to room temperature, solidifying at 40–45° C. After standing overnight the product was filtered-off and washed with 74 OP ethanol (2×50 ml). Most of the colour was removed by this process, resulting in a grey coloured product which was air dried on the filter and then dried in a vacuum oven at 40° C.

Yield=116.5 g (86%, mpt 88–98° C.)

(ii) Preparation of 2-Cyano-3-ethoxythiocrotonamide

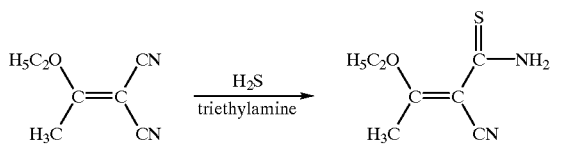

A 2 liter multi-neck flask was equipped with a gas inlet, air stirrer, thermometer and condenser and exit which was vented via a scrubber system to destroy hydrogen sulphide. To the flask was charged with (1-ethoxyethylidene) malononitrile (95 g, 0.698 moles) toluene, (750 ml) and triethylamine (5 ml). Much of the solid was soluble in the toluene but some remained out of solution. Hydrogen sulphide was then bubbled through the solution.

A precipitate began to form almost immediately. Within 30 minutes the reaction mixture had become a thick paste, blocking the gas inlet tube. At this point the product formed so far was filtered-off. The filtrates were returned to the reaction flask and hydrogen sulphide again bubbled into the solution. After a further 20–30 minutes the mixture had become a thick paste and so the product was filtered-off and combined with the earlier crop. Hydrogen sulphide was again bubbled through the filtrates but no more gas appeared to be taken up. The solution was filtered as before and the combined solids washed with cold toluene (3×150 cm$^3$). The resulting yellow-brown product was then dried in a vacuum oven at 45–50° C. TLC showed acceptable quality product (silica, eluent chloroform, $R_f$ 0.1).

Yield=80.6 g (68%)

The product was utilised in the next stage without further purification.

(iii) Preparation of 3-amino-2-cyanothiocrotonamide

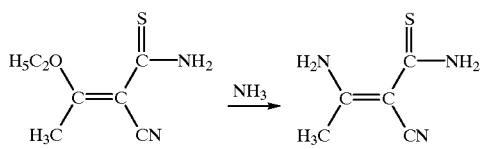

A 3 liter multi-neck flask was equipped with air stirrer, gas inlet, thermometer and condenser. To the flask was charged 2-cyano-3-ethoxythiocrotonamide (68 g, 0.4 mole) and 74 OP ethanol (2 liters). The mixture was then stirred at room temperature. Very little of the solid appeared to dissolve. Ammonia was then bubbled through the reaction mixture. After approximately 15 minutes it became apparent that the starting material was reacting, evidenced by the increased solubility, and after 30 minutes a homogeneous solution resulted. Passage of ammonia through the solution was continued until no more gas was taken up. TLC showed the reaction to be complete, as evidenced by the disappearance of the starting material (silica, eluent 30% ethyl acetate in toluene, $R_f$ product: 0.5, $R_f$ starting material: 0.1).

The solution was filtered and the liquors evaporated to dryness. The resultant dark brown solid was dissolved in refluxing ethyl acetate (750 ml) and the hot solution decanted from the insoluble black oil. The solution was cooled to room temperature and then concentrated by evaporation to a volume of 100–150 ml. Hexane (250 ml) was then added to the slurry and the brown product filtered off and washed with hexane (2×100 ml, 1×50 ml). The sand coloured product was dried in a vacuum oven at 40–45° C.

Yield=45.4 g (81%)

iv) Preparation of 5-amino-4-cyano-3-methyl isothiazole

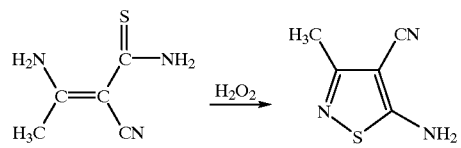

A 3 liter multi-neck flask was equipped with dropping funnel, air stirrer, thermometer and condenser. To the flask was charged 3-amino-2-cyanothiocrotonamide 1 (40 g, 0.283 mole) and methanol (2 liters). A dark, almost homogeneous solution resulted. Hydrogen peroxide (80 ml, 100 vol, 0.7 mole) was then added dropwise over a period of 10 minutes. On completion of the addition the reaction mixture was slowly heated to reflux over a period of 30 mins and refluxing continued for 30 mins. TLC indicated complete reaction (silica, CHCl$_3$). The hot solution was treated with activated carbon and then filtered through kieselguhr. The filtrates were then concentrated by evaporation to a volume of about 300 ml. The concentrated slurry was poured into ice-water (1400–1500 g) and the resultant product filtered-off, washed with water (2×150 ml), pulled as dry as possible on the filter and finally dried in a vacuum oven at 55° C.

Yield=28.7 g (73%)

(c) Synthesis of title dye

Acetic acid (60 ml), propionic acid (15 ml) and nitrosyl sulphuric acid (11.1 ml) were placed in a beaker and cooled to 0–5° C. The 5-amino-4-cyano-3-methylisothiazole resulting from stage (b), (4.17 g) was added in portions and the reactions stirred for 2 hours at 0–5° C. Excess nitrous acid was destroyed with sulphamic acid and the resulting diazonium solution was added with stirring to a solution of the coupling component prepared as described in 1(a) above (8.31 g) in methanol (200 ml) at 0–5° C. After the addition was complete, sodium acetate was added to pH 4.5 and the reaction stirred for 1½ hours at 0–5° C. Water (500 ml) was added and the crude product was isolated by extracting into dichloromethane. The product was purified by column chromatography on silica gel eluting with methanol/dichloromethane (in a respective volume ratio of 15:85) to give the title dye as an oil (3.8 g) having a λmax at 532 nm.

EXAMPLE 2

Preparation of a dye of the following formula (Dye 2)

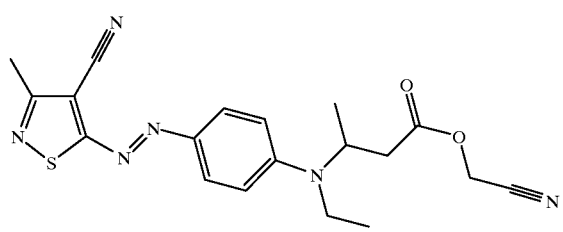

a) Preparation of a coupling component of formula:

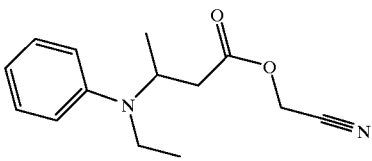

(i) Aniline (46.5 g) and crotonic acid (60.0 g) were mixed together and stirred for 16 hours at 80° C. The reaction mixture was cooled to room temperature and dissolved in dichloromethane (200 ml). The product was extracted into dilute hydrochloric acid (pH 1) (2×100 ml), the pH was then adjusted to 10 with sodium carbonate and the solution washed with ethyl acetate. The aqueous solution was then adjusted to pH4 with conc. hydrochloric acid and extracted into dichloromethane (3×200 ml) giving a yellow gum (82 g).

(ii) The above product (18.8 g), iodoethane (17.2 g), calcium carbonate (10.0 g) and water (150 ml) were placed in a flask and heated with stirring at 70° C. for 24 hours. The reaction was allowed to cool to room temperature, filtered through kieselguhr, extracted into dichloromethane and evaporated to give a brown gum (18.19 g).

(iii) The product from part 2(a)(ii) above (10.0 g), chloroacetonitrile (5.80 g) and triethylamine (40 ml) were heated at 65° C. for 4 days. The reaction was cooled to room temperature and water (150 ml) was added. The product was extracted into dichloromethane and purified by column chromatography on silica gel eluting with ethyl acetate/hexane (20:80) to give a yellow oil (4.5 g).

(b) Synthesis of the title dye

The 5-amino-4-cyano-3-methylisothiazole resulting from Example 1, stage (b) (1.95 g), was diazotised and reacted (as described in Example 1, stage (c)) with coupling component prepared as described in step (a) above (4.5 g) to give the crude product. The dye was purified by column chromatography on silica gel eluting with ethyl acetate/hexane (in a respective 20:80 volume ratio) to leave the title dye as an oil (2.2 g) having a λmax at 524 nm.

EXAMPLE 3

(Dye 3)

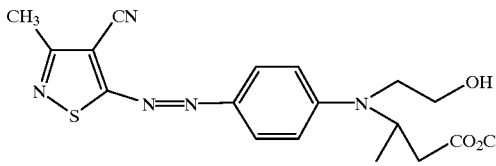

Dye 3 was prepared using the method described in Example 1 except that in stage (a)(ii) there was used chloroethanol in place of iodoethane. Dye 3 had a λmax at 522 nm.

EXAMPLE 4

(Dye 4)

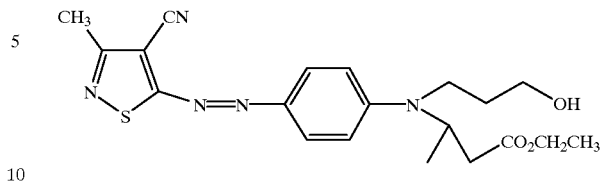

Dye 4 was prepared using the method described in Example 1 except that in stage (a)(ii) there was used 1-hydroxy-3-chloropropane in place of iodoethane. Dye 4 had a λmax at 530 nm.

EXAMPLE 5

(Dye 5)

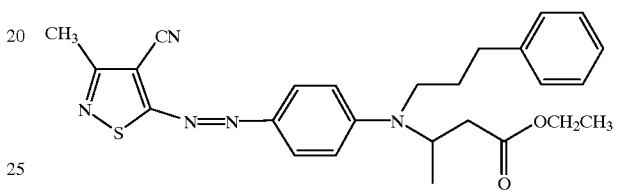

The method of Example 1 was repeated except that in stage (a) in place of ethylacetoacetate there was used cinnamaldehyde and the reaction was stirred at 60° C. for 30 hours instead of 30 minutes.

The title dye had a λmax at 533 nm.

EXAMPLE 6

(Dye 6)

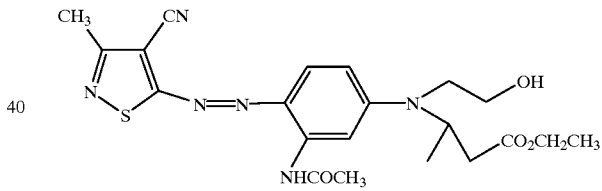

Dye 6 was prepared using the method described in Example 1 except that in stage (a)(i) 3-aminoacetanilide was used in place of aniline and in stage (a)(ii) there was used chloroethanol in place of iodoethane. The title product had a λmax at 524 nm.

EXAMPLE 7

(Dye 7)

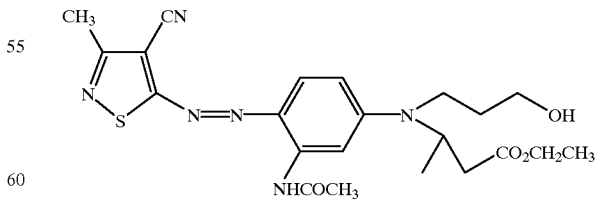

Dye 7 was prepared using the method described in Example 1 except that in stage (a)(i) 3-aminoacetanilide was used in place of aniline and in stage (a)(ii) there was used 1-hydroxy-3-chloropropane in place of iodoethane. The title dye had %max at 545 nm.

EXAMPLE 8
(Dye 8)

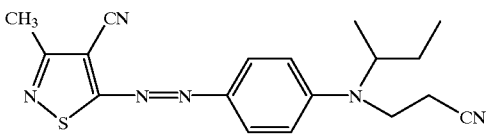

(a) Preparation of coupling component

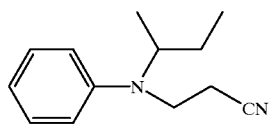

(i) Aniline (70.6 g), activated zinc dust (200 g), acetic acid (640 ml), water (64 ml) and methyl ethyl ketone (54.8 g) were heated at 65° C. for 2 hours and then allowed to cool to room temperature. The reaction mixture was diluted with methanol (300 ml) and then filtered. The residue was washed with methanol (3×150 ml) and the combined filtrates were evaporated to about 200 ml. Ice (300 g) was added and the pH was adjusted to 10 using ammonia. The product was extracted using dichloromethane and the solvent evaporated off to give a clear orange liquid.

(ii) The product from stage (i)(30 g), acrylonitrile (54 ml), CuCl (8.4 g) and acetic acid (90 ml) were placed in a flask and heated at 80° C. for 12 hours. The reaction mixture was allowed to fall to room temperature and poured into ammonia solution (250 ml). The product was extracted with dichloromethane and the solvent evaporated off to give 45 g of a brown oil.

(b) Synthesis of the title dye

The title dye was synthesised by the method described in Example 1 except that in stage (c) there was used the coupling component from Example 8, stage (a) in place of the coupling component from Example 1, stage (a). The title dye had a λmax at 511 nm.

EXAMPLE 9
(Dye 9)

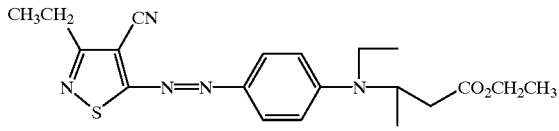

Dye 9 was prepared by the method described in Example 1 except that in stage (b) (i) there was used triethyl orthopropionate in place of triethyl orthoacetate. The resultant dye had a %max at 531 nm.

EXAMPLE 10
Inks
Preparation of Inks
The following abbreviations are used:
XA is Xerox 4024 paper from Rank Xerox;
GB is Gilbert Bond paper from the Mead Corporation;
WC is Wiggins Conqueror High White Wove 100 gm$^{-2}$ paper from Arjo Wiggins Ltd; and
"-" means not measured;
OD means optical density;
LF means light fastness ΔE is the time in hours over which the LF is measured; and
WF: Wet fastness.

Each dye or dye mixture was dissolved in benzyl alcohol and 2-pyrrolidone. The water-dissipatable polyester was dissipated in water and then mixed with the dye solution and shaken to give the homogeneous ink.

Table 1 below shows the final formulation of inks prepared as above. The first column identifies the component and the subsequent columns show the amount in parts by weight of each component in the resultant ink.

TABLE 1

| Component | Ink 1 | Ink 2 |
| --- | --- | --- |
| Dye from Example 1 | 1 | |
| Dye from Example 2 | | 1 |
| Benzyl Alcohol | 10 | 10 |
| 2-Pyrollidone | 20 | 20 |
| Resin 3[a] | 45 | 45 |
| Water | 24 | 24 |

Footnotes
[a]20% w/v solution in water at pH 7.0.

The inks described above were printed onto different paper using a Olivetti JP 450 ink jet printer and tested as follows (the results are given in Table 2):
The Chroma and the OD of a print was measured using an X-Rite 938 Spectrodensitometer;

the LF was determined by the change in I.a.b coordinates as measured by an X-Rite 938 Spectrodensitometer after the print has been irradiated for 100 hrs (ΔE) in a Atlas Ci35A Weatherometer, where a low figure indicates high light-fastness;

the WF was determined by running water (2 ml) down lines of print at an angle of approximately 45° immediately after the lines had been printed and the prints were given a score of 1–10 where 1 indicates poor wet fastness and indicates no detected ink run down.

TABLE 2

| Ink | Paper | Chroma | OD | LF | WF |
| --- | --- | --- | --- | --- | --- |
| 1 | WC | 59.0 | 1.09 | 9.5 | 10 |
| 1 | XA | 55.0 | 1.01 | 11.2 | 10 |
| 2 | WC | 54.2 | 1.0 | 6.8 | 10 |
| 2 | XA | 52.7 | 0.96 | 7.3 | 10 |

Further inks comprising the exemplified dyes and resins may be may be prepared having the formulations described in the following tables. In the tables the number in the first column (headed Ex. no.) denotes the example number(s) of dye(s) to be used in the ink and the number in the second column indicates the parts per weight of the total dye added. In the third column "Resin#" identifies which of Resins 1, 2 and 3 was used (each resin comprising 20% solids and 80% water) with the number of parts by weight of the resin being shown in brackets. Numbers quoted in the third column onwards refer to the number of parts of the relevant ingredient and all parts are by weight.

The following other abbreviations are used in the tables:

| BZ = benzyl alcohol; | DEG = diethylene glycol; | NMP = N-methyl pyrolidone; |
| --- | --- | --- |
| TEN = triethanolamine; | CAP = caprolactam; | BUT = butylcellosolve; |

-continued

ACE = acetone; IPA = isopropanol; MEOH = methanol;
2P = 2-pyrolidinone; MIBK = methyl-isobutyl ketone; TDG = thiodiglycol;
PHO = K$_2$PO$_4$; FRU: fructose; SUR = Surfynol 465 (a surfactant); and
DMB = diethylene glycol monobutyl ether.

TABLE 3

| Ex. no. | Dye | Resin (parts) | Water | BZ | DEG | ACE | 2P | MIBK | BUT |
|---|---|---|---|---|---|---|---|---|---|
| 1 | 2.0 | 1 (10) | 58 | | 6 | 4 | 10 | 10 | |
| 1 | 2.1 | 2 (6) | 60.9 | 8 | | | 20 | 1 | 2 |

TABLE 3-continued

| Ex. no. | Dye | Resin (parts) | Water | BZ | DEG | ACE | 2P | MIBK | BUT |
|---|---|---|---|---|---|---|---|---|---|
| 2 | 1.8 | 2 (10) | 63.2 | 5 | | | 15 | | 5 |
| 2 | 5.0 | 3 (4) | 50.0 | 20 | 2 | 1 | 15 | 3 | |
| 1 | 1.0 | 3 (7) | 63 | 5 | 4 | | 15 | 5 | |

TABLE 4

| Ex. no. | Dye | Resin (parts) | Water | BZ | DEG | ACE | NaOH | IPA | 2P |
|---|---|---|---|---|---|---|---|---|---|
| 2 | 3.0 | 1 (10) | 62.8 | 5 | 4 | | 0.2 | | 15 |
| 1 | 5.0 | 2 (15) | 50 | 20 | | | | 10 | |
| 2 | 2.0 | 3 (5) | 65.7 | 10 | | 5 | 0.3 | 3 | 10 |

TABLE 5

| Ex. No. | Dye | Resin (parts) | Water | BZ | DEG | ACE | NaOH | (NH$_4$)$_2$SO$_4$ | 2P | MIBK | BUT |
|---|---|---|---|---|---|---|---|---|---|---|---|
| 1 | 1.1 | 2 (12) | 61.9 | | 9 | | 0.5 | 0.5 | 9 | 5 | 1 |
| 2 | 4.1 | 3 (10) | 68.6 | 11 | 2 | 4 | | 0.3 | | | |

TABLE 6

| Ex. No. | Dye | Resin (parts) | Water | BZ | DEG | ACE | IPA | MeOH | 2P | MIBK | BUT |
|---|---|---|---|---|---|---|---|---|---|---|---|
| 1 + 2 | 5.0 | 3 (5) | 54 | 15 | 3 | 3 | 6 | | 5 | 4 | |
| 2 | 2.4 | 1 (5) | 51.6 | 5 | | 4 | | 6 | 20 | 5 | 1 |
| 1 | 3.2 | 2 (4) | 57.8 | 8 | 4 | 3 | 5 | 4 | 6 | 5 | |
| 1 | 5.0 | 3 (10) | 70 | 6 | 2 | 2 | 1 | | 4 | | |
| 2 | 3.3 | 2 (12) | 63.7 | | | 10 | | 2 | | 6 | 3 |

TABLE 7

| Ex. no. | Dye | Resin (parts) | Water | BZ | NMP | FRU | DMB | CH$_3$NH$_2$ | CAP |
|---|---|---|---|---|---|---|---|---|---|
| 2 | 4.0 | 2 (10) | 67 | 10 | 4 | 1 | 4 | 0.2 | |
| 1 | 2.2 | 2 (10) | 67 | 10 | 3 | 2 | 6 | | |
| 1 | 5.0 | 3 (12) | 54.4 | 5 | 17 | | 7 | | |
| 2 | 4.0 | 3 (20) | 56 | 5 | 8 | | 5 | | 2 |
| 1 | 3.0 | 2 (13) | 70 | | 2 | | 12 | | |

TABLE 8

| Ex. no. | Dye | Resin (parts) | Water | BZ | NMP | TDG | FRU | PHO | DMB | CAP |
|---|---|---|---|---|---|---|---|---|---|---|
| 1 | 2.5 | 2 (15) | 60 | 6 | 15 | | | 0.12 | | 4 |
| 2 | 0.9 | 1 (5) | 63 | 10 | 20 | | 0.5 | 0.2 | | |
| 1 | 5.0 | 2 (10) | 57 | 11 | | 10 | | | 6 | 1 |
| 2 | 2.0 | 2 (10) | 56 | 10 | 5 | 12 | | | 5 | |

TABLE 9

| Ex. No. | Dye | Resin (parts) | Water | BZ | NMP | SUR | TEN | TDG | FRU | PHO | DMB |
|---|---|---|---|---|---|---|---|---|---|---|---|
| 1 | 1.5 | 1 (10) | 63 | 5 |   | 0.15 | 0.5 | 20 |   |   |   |
| 2 | 2.1 | 1 (15) | 65 | 5 | 5 | 0.1 | 0.2 | 2 | 0.5 | 0.1 | 5 |

TABLE 10

| Ex. No. | Dye | Resin (parts) | Water | BZ | NMP | SUR | TDG | CH$_3$NH$_2$ | CAP |
|---|---|---|---|---|---|---|---|---|---|
| 1 | 3.1 | 3 (10) | 64 | 8 |   | 0.3 | 15 | 0.2 |   |
| 2 | 5.0 | 1 (15) | 43 | 15 | 15 |   | 5 |   | 2 |

TABLE 11

| Ex. No. | Dye | Resin (parts) | Water | BZ | NMP | TEN | TDG | PHO | DMB | CH$_3$NH$_2$ | CAP |
|---|---|---|---|---|---|---|---|---|---|---|---|
| 2 | 4.0 | 3 (15) | 59 | 9 | 7 | 0.5 |   | 0.95 | 5 |   |   |
| 1 | 5.0 | 1 (5) | 71 | 15 |   | 1 | 1 |   |   | 1 | 1 |

EXAMPLE 11

Preparation of Inks

Inks were prepared having the formulations given in Table 12 below, where the numbers in the columns for Inks 3 to 9 indicate the number of parts of the relevant component by weight.

TABLE 12

| Component | Ink 3 | Ink 4 | Ink 5 | Ink 6 | Ink 7 | Ink 8 | Ink 9 |
|---|---|---|---|---|---|---|---|
| Dye 3 | 1.5 |   |   |   |   |   |   |
| Dye 4 |   | 1.5 |   |   |   |   |   |
| Dye 5 |   |   | 1.5 |   |   |   |   |
| Dye 6 |   |   |   | 1.5 |   |   |   |
| Dye 7 |   |   |   |   | 1.5 |   |   |
| Dye 8 |   |   |   |   |   | 1 |   |
| Dye 9 |   |   |   |   |   |   | 1.5 |
| Benzyl Alcohol | 12 | 12 | 20 | 12 | 12 | 10 | 10 |
| 2-Pyrollidone | 20 | 20 | 20 | 20 | 20 | 20 | 20 |
| Resin 3* | 20 | 20 | 20 | 20 | 20 | 45 | 45 |
| Water | 54.5 | 54.5 | 37.5 | 54.5 | 54.5 | 24 | 23.5 |
| Surfactant | 3 | 3 | 1 | 3 | 3 |   |   |

*20% w/v solution in water at pH 7.0.

EXAMPLE 12

Jet Printing onto Papers

Inks 3 to 9 described in Table 12 above were printed onto papers and the chroma, OD, LF and WF were measured using the method described in Example 10. The results are shown in Table 13 below where all abbreviations are as defined in Example 10.

TABLE 13

| Ink | Paper | Chroma | OD | LF | WF |
|---|---|---|---|---|---|
| 3 | XA | 51.8 | 0.66 | 9.61* | 10 |
| 3 | HG201 | 69.8 | 0.93 | 14.3* | 10 |
| 4 | XA | 56.6 | 0.92 | 10.6 | 10 |
| 4 | HG201 | 82.1 | 1.54 | 15.3 | 10 |
| 5 | XA | 53.5 | 0.89 | 17.6 | 10 |
| 5 | WC | 55.2 | 0.89 | 18.2 | 10 |
| 6 | XA | 55.1 | 0.84 | 19.7 | 10 |
| 6 | HG201 | 81.2 | 1.37 | 38.4 | 10 |
| 7 | XA | 53.7 | 1.02 | 13.0 | 9 |
| 7 | HG201 | 81.2 | 1.87 | 17.4 | 9 |
| 8 | WC | 51.9 | 0.84 | 16.2 | 10 |
| 8 | XA | 50.3 | 0.84 | 15.3 | 10 |
| 9 | WC | 54.8 | 1.02 | 6.71 | 10 |
| 9 | XA | 55.6 | 1.06 | 11.0 | 10 |

*After 50 hours.

What is claimed is:

1. An ink comprising water, a water-dissipatable polymer and one or more dyes of Formula (1):

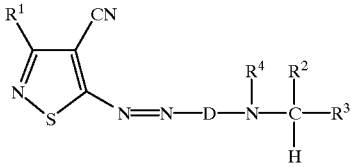

Formula (1)

wherein:
$R^1$ is H; halo; optionally substituted alkyl, aryl or aralkyl; or a group of formula —X—$R^5$ wherein X is O, S, SO, SO$_2$ or N$R^6$ wherein $R^5$ and $R^6$ are each independently H or optionally substituted alkyl, aryl or aralkyl;

$R^2$ and $R^3$ are each independently optionally substituted alkyl, aryl or aralkyl, or $R^2$ and $R^3$ together with the carbon atom to which they are attached form an optionally substituted ring;

$R^4$ is H or optionally substituted alkyl, aryl or aralkyl; and

D is an optionally substituted arylene group.

2. An ink according to claim 1 wherein $R^2$ and $R^3$ are each independently optionally substituted $C_{1-6}$-alkyl, or $R^2$ and $R^3$ together with the carbon atom to which they are attached form an optionally substituted 5- or 6-membered ring.

3. An ink according to claim 1 or 2 which comprises:
(a) from 0.5 to 15 parts in total of one or more of the dyes of Formula (1);
(b) from 0.2 to 25 parts of the water-dissipatable polymer;
(c) from 40 to 90 parts of water; and
(d) from 0 to 60 parts of organic solvent;
where all parts are by weight and the total number of parts (a)+(b)+(c)+(d) add up to 100.

4. An ink according to claim 3 wherein the organic solvent consists of a mixture of a water-miscible organic solvent and a water-immiscible organic solvent.

5. An ink according to claim 1 or 2 which has been filtered to remove particulate matter through a filter having a mean pore size below 10 μm.

6. A composition comprising water and two or more dyes of Formula (1)

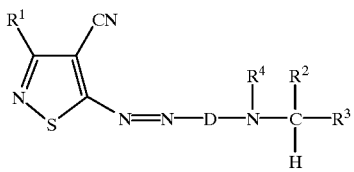

Formula (1)

wherein:

$R^1$ is H; halo; optionally substituted alkyl, aryl or aralkyl; or a group of formula —X—$R^5$ wherein X is O, S, SO, $SO_2$ or $NR^6$ wherein $R^5$ and $R^6$ are each independently H or optionally substituted alkyl, aryl or aralkyl;

$R^2$ and $R^3$ are each independently optionally substituted alkyl, aryl or aralkyl, or $R^2$ and $R^3$ together with the carbon atom to which they are attached form an optionally substituted ring;

$R^4$ is H or optionally substituted alkyl, aryl or aralkyl; and

D is an optionally substituted arylene group.

7. A process for printing an image on a substrate comprising applying thereto, by means of an ink jet printer, an ink according to claim 1 or 2.

8. A cartridge suitable for use in an ink jet printer containing an ink according to claim 1 or 2.

9. An ink jet printer containing an ink according to claim 1 or 2.

* * * * *